J. SANDER.
Meat-Chopping Machines.
No. 199,317 Patented Jan. 15, 1878.
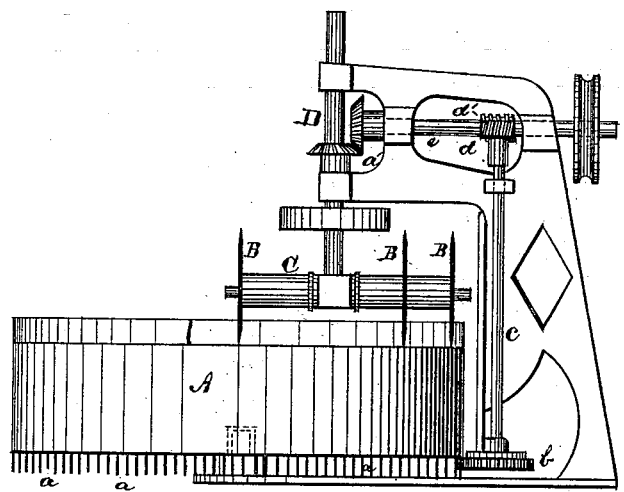

UNITED STATES PATENT OFFICE.

JOHN SANDER, OF NEWARK, NEW JERSEY.

IMPROVEMENT IN MEAT-CHOPPING MACHINES.

Specification forming part of Letters Patent No. 199,317, dated January 15, 1878; application filed September 7, 1876.

*To all whom it may concern:*

Be it known that I, JOHN SANDER, of the city of Newark, in the county of Essex and State of New Jersey, have invented certain new and useful Improvements in Meat-Chopping Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to certain improvements in the construction and operation of meat-chopping machines, the objects of which are that the wear and tear upon the block occasioned by the knives or cutters is uniform upon its whole surface, and also to facilitate its operation and make it more effective.

The accompanying drawing fully illustrates the nature and character of my invention, it being a side elevation of a meat-chopper constructed in accordance with the principles embodied in my invention.

In carrying out my invention I construct and arrange the block A, the top of which may form the bottom of a basin or trough, in which the meat is placed, so as to rotate slowly upon its center, for which purpose it is provided with cogs $a$ around the bottom, which engage with suitable gear $b$, secured to a vertical shaft, $c$, as shown in the drawing. On the top of said shaft $c$ is also secured a gear, $d$, which engages with a worm-gear, $d'$, upon the main horizontal driving-shaft $e$, by means of which the block A is caused to rotate, as above stated.

The cutters B are adjusted and revolve upon a horizontal shaft, C, which is rigidly secured to a vertical shaft, D, the latter being caused to rotate rapidly by means of suitable gear $a'$, secured thereto and to the main shaft $e$, all as shown in the drawing.

It will be observed that the cutter on the left in the drawing travels on a circular path between the paths of the other two, and these cutters may be increased in number, or arranged to cut more or less closely, if desired, without departing from the general principle embodied in my invention.

It may be of advantage to arrange the cutters so that their tops incline inward toward each other or the center, which will cause them to rotate easier, as will be obvious.

The result of the foregoing-described arrangement and adjustment of the several parts and their mode of operation is that the whole surface of the block A, as already stated, is worn evenly, and the meat thoroughly and uniformly cut.

Having thus described my invention, what I claim as new, and desire to secure by Letters Patent of the United States, is—

The combination of the cutters B, mounted upon the horizontal shaft C, vertical shaft D, and mechanism for rotating the same, and cutting-block A, having its center eccentric to the vertical shaft, all operating as set forth.

In testimony that I claim the foregoing as my own I hereto affix my signature in presence of two witnesses.

JOHN SANDER.

Witnesses:
 OLIVER DRAKE,
 JOHN C. TUNBRIDGE.